United States Patent [19]

Hu

[11] Patent Number: 5,748,247
[45] Date of Patent: May 5, 1998

[54] REFINEMENT OF BLOCK MOTION VECTORS TO ACHIEVE A DENSE MOTION FIELD

[75] Inventor: Shane Ching-Feng Hu, Beaverton, Oreg.

[73] Assignee: Tektronix, Inc., Wilsonville, Oreg.

[21] Appl. No.: 629,421

[22] Filed: Apr. 8, 1996

[51] Int. Cl.$^6$ .............................. H04N 7/30; H04N 7/32
[52] U.S. Cl. ........................ 348/413; 348/416; 348/699
[58] Field of Search ................................. 348/413, 416, 348/699; H04N 7/30, 7/32

[56] References Cited

U.S. PATENT DOCUMENTS

| | | | |
|---|---|---|---|
| 5,228,098 | 7/1993 | Crinon et al. | 382/56 |
| 5,557,341 | 9/1996 | Weiss et al. | 348/699 |
| 5,561,475 | 10/1996 | Jung | 348/699 |

*Primary Examiner*—Tommy P. Chin
*Assistant Examiner*—Diep Nhon Thanh
*Attorney, Agent, or Firm*—Francis I. Gray

[57] ABSTRACT

Refinement of motion block motion vectors to achieve a dense motion field for temporal video signal processing makes use of candidate motion vectors from a parent block and neighboring child block groups to determine the motion vector for a child block within one of the child block groups. The vicinity of each candidate motion vector may be searched to obtain a trial motion vector having a minimum displaced frame difference measure, with the trial motion vector with the minimum displaced frame difference measure from among all the trial motion vectors being the motion vector for the child block. Alternatively each candidate motion vector may be applied to the child block, and the vicinity of the candidate motion vector having the minimum displaced frame difference being searched to obtain the motion vector for the child block. If the minimum displaced frame difference is not less than a given threshold, the child block is segmented and the process repeated until the child block size is a single pixel or the minimum displaced frame difference is less than the threshold.

3 Claims, 2 Drawing Sheets

REFINEMENT OF BLOCK MOTION VECTORS TO ACHIEVE A DENSE MOTION FIELD

BACKGROUND OF THE INVENTION

The present invention relates to video signal processing including video compression, temporal interpolation and the like, and more particularly to a method of refining block motion vectors to achieve a dense motion field.

Video and many medical images are received as sequences of two-dimensional image frames or fields. To transmit such images as digital signals some form of compression is required. Three basic types of redundancy are exploited in a video compression process: temporal redundancy, spatial redundancy and amplitude redundancy. Interframe coding techniques make use of the redundancy between successive frames (temporal redundancy). In these techniques the information defining elements of a picture, i.e., pixels, are estimated by interpolation or prediction using information from related locations in preceding and/or succeeding versions of the picture, as exemplified in U.S. Pat. No. 4,383,272 issued May 10, 1983 to Netravali et al entitled "Video Signal Interpolation Using Motion Estimation." A typical compression encoder is shown in FIG. 1 where a preprocessed video signal is input to a motion estimator. The motion estimator delays the video signal, to compensate for the processing delays for the motion vector generation process, before providing the video signal to an encoder loop where compression is performed. The compression is performed using a motion vector generated by the motion estimator, which is multiplexed with the compressed video signal at the output of the encoder loop for transmission.

The interpolation between frames in the compression encoder is performed by first estimating the motion trajectory, i.e., motion vector or displacement vector, of each pixel. If an estimate of such displacement is available, then more efficient prediction may be performed in the encoder by relating to elements in a previous frame that are appropriately spatially displaced. These displacement vectors are used to project each pixel along its trajectory, resulting in the motion compensated prediction or interpolation. Once the motion vectors are determined, then the differences between consecutive motion compensated frames that exceed a predetermined threshold are determined by the encoder loop as the compressed video signal.

Most motion estimation in interframe coding assumes (i) objects move in translation, i.e., zoom and rotation are not considered, (ii) illumination is spatially and temporally uniform, and (iii) occlusion of one object by another and uncovered background are not considered. In practice motion vectors are estimated for blocks of pixels so that the displacements are piecewise constant. Block matching is used to estimate the motion vector associated with each block of pixels in a current coding frame or field, assuming that the object displacement is constant within a small two-dimensional block of pixels. In these methods the motion vector for each block in the current frame or field is estimated by searching through a larger search window in a previous frame/field and/or succeeding frame/field for a best match using correlation or matching techniques. The motion estimator compares a block of pixels in the current frame with a block in the previous or future frame by computing a distortion function, such as shown in FIG. 2. Each block in the current frame is compared to displaced blocks at different locations in the previous or future frame within a search window, and the displacement vector that gives the minimum value of the distortion function is selected as being the best representation of the motion for that block. A motion vector refinement generator, as shown in FIG. 2, further processes the selected motion vector to provide a final motion vector output.

For motion compensated image sequence interpolation in the temporal domain, a dense motion field, i.e., a motion field resolved on a per pixel level, is required in order to have no blocking artifacts. For example if motion vectors of an N×M pixel block are used to carry out the motion compensated video sequence interpolation, blocking artifacts are most likely visible around objects which move independently with respect to each other and/or to the background. When two objects, portions of which occur within a single search block, are moving relative to each other, one of the objects constitutes a majority of the pixels in the block. The resulting block motion vector most likely tracks the majority object motion, so that part of the block which doesn't belong to the majority object, but rather to the minority object, has the wrong motion vector associated with it. In other words blocking artifacts occur due to the fact that block segmentation of the motion field does not correspond to a perfect per object segmentation in the video sequence.

Block based motion compensated compression systems are well established as described above, such as the MPEG-1 and MPEG-2 compression standards. For motion compensating video sequence interpolation, the simple search method based solely on minimizing the displaced frame difference (DFD) measure often fails to produce good visual results. Hierarchical block matching techniques have been used to produce a homogeneous motion vector field, but the hierarchical approach lacks resolution in complex scenes. A statistical Gibbs/Markov model has been used to maximize the probability that the derived motion vector field represents the "true" physical motion of the scene, but this approach is often stochastic in nature and involves iterated computations. Quad-tree type decomposition/segmentation schemes also are well known for two-dimensional (2D) image data, which may be coupled with motion estimation to derive the motion vector field, but the sub-divided block again goes through the same motion estimation procedure as the parent block so an important neighborhood constraint is not used.

In order to resolve the motion field boundary along an arbitrary object edge, the motion field needs to be segmented along the boundary in a dense fashion, with per pixel motion field vectors being deemed dense enough for interpolation purposes.

SUMMARY OF THE INVENTION

Accordingly the present invention provides a method of refining block motion vectors to achieve a dense motion field. A parent block is subdivided, or segmented, into four child block groups. For any child block within a group there are three neighboring child block groups. The motion vectors for the parent block and each neighboring child block group are determined and selected as a set of candidate motion vectors for the child block. The motion vector search is restricted to a vicinity around each of the candidate motion vectors. The resulting motion vector with the minimum displaced frame difference (DFD) measure is the motion vector for the child block. Alternatively each candidate motion vector is applied to the child block and the one selected for search in the vicinity is the one with the minimum DFD measure. In either case if the DFD measure is within a certain threshold, then that motion vector becomes the fine motion vector for the child block. Otherwise the child block group of the child block becomes the parent block and the process is repeated until the desired fine resolution as determined by the threshold is reached. Thus the motion vector for an object is determined by the shape of the object, and not by an arbitrary block configuration.

The objects, advantages, and other novel features of the present invention are apparent from the following detailed description when read in conjunction with the appended claims and attached drawing.

DESCRIPTION OF THE PREFERRED EMBODIMENT

Figure 1:
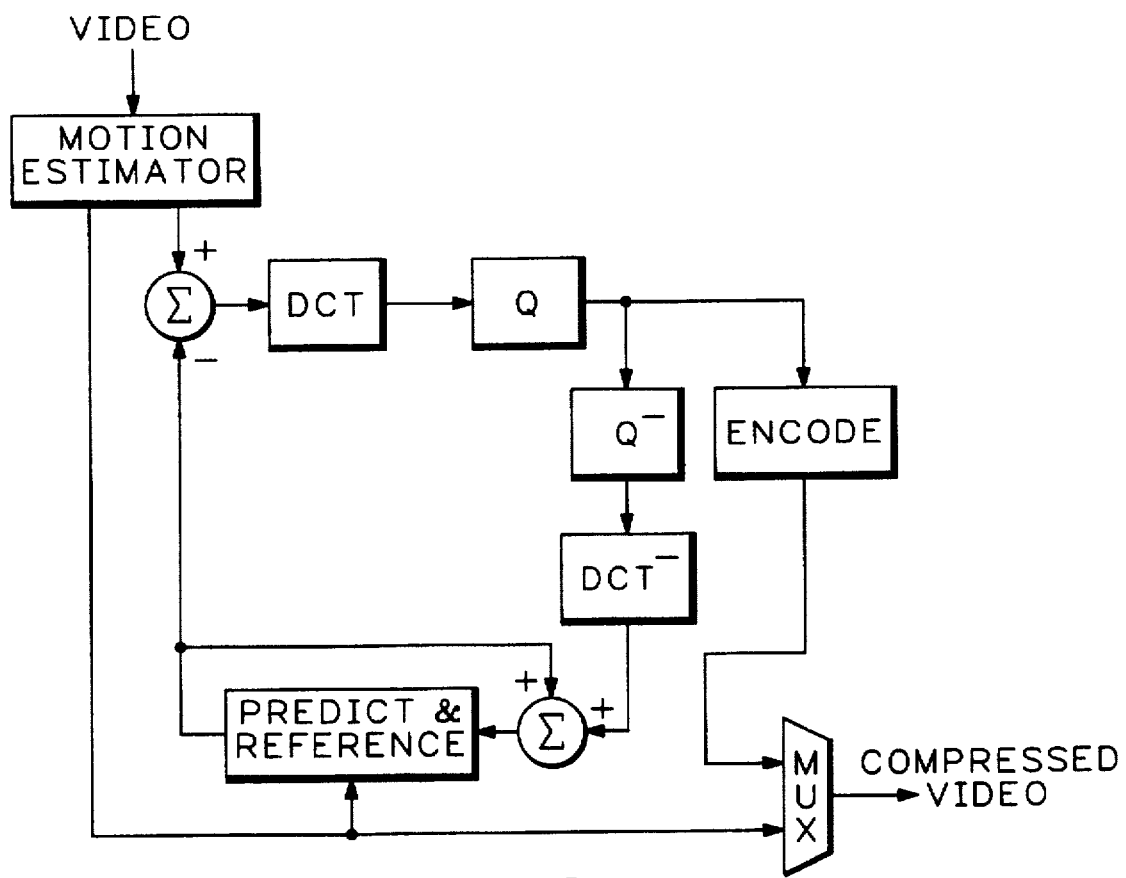
FIG. 1 is a block diagram view of a prior art video compression system which may include refining block motion vectors to achieve a dense motion field according to the present invention.
Figure 2:
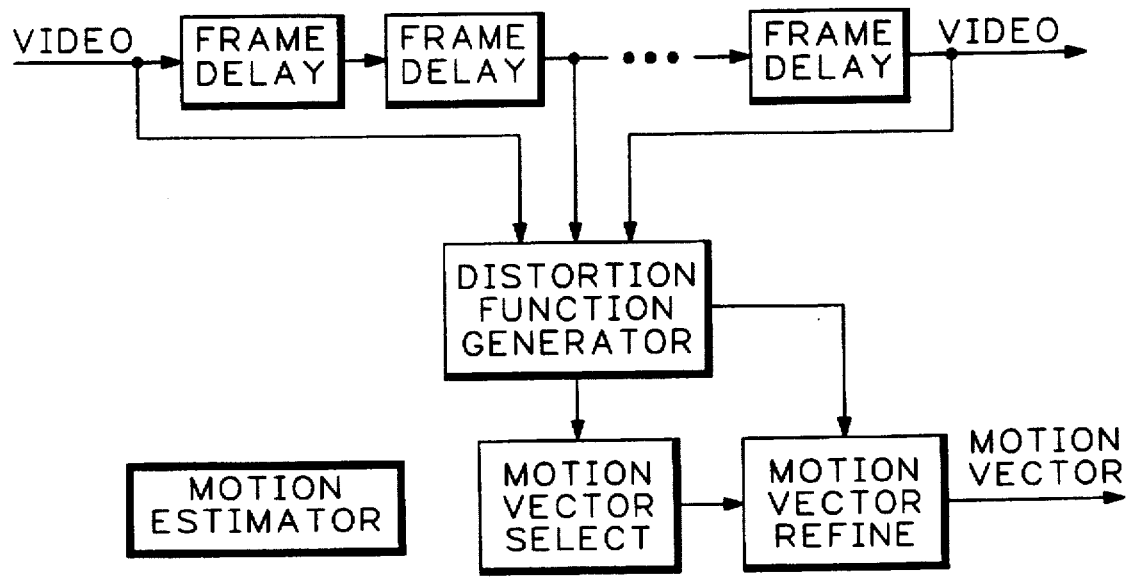
FIG. 2 is a block diagram view of a prior art motion estimator which may include refining block motion vectors to achieve a dense motion field according to the present invention.
Figures 3, 4:
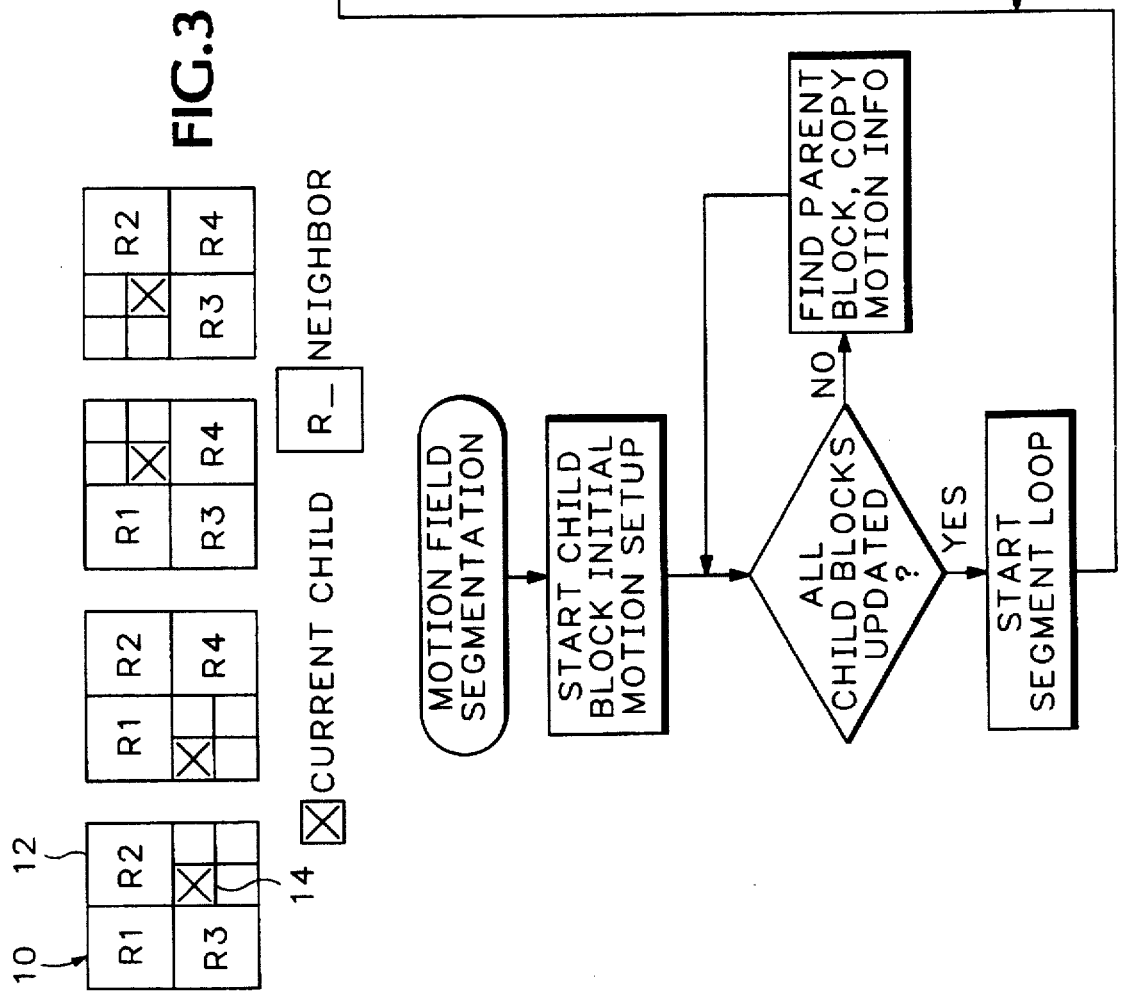
FIG. 3 is an illustrative view of segmentation of a motion vector field using block matching according to the present invention.
FIG. 4 is a functional block diagram view for refining block motion vectors according to the present invention.
Figure 4:
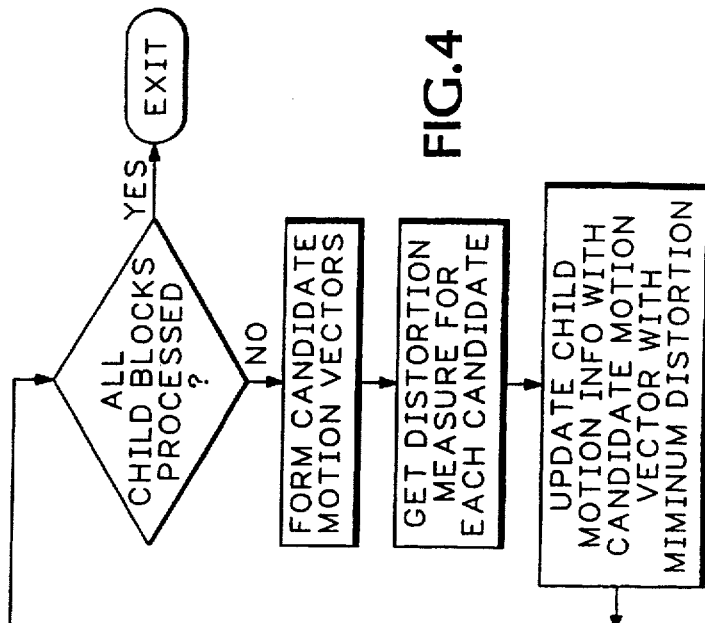
Figure 3:
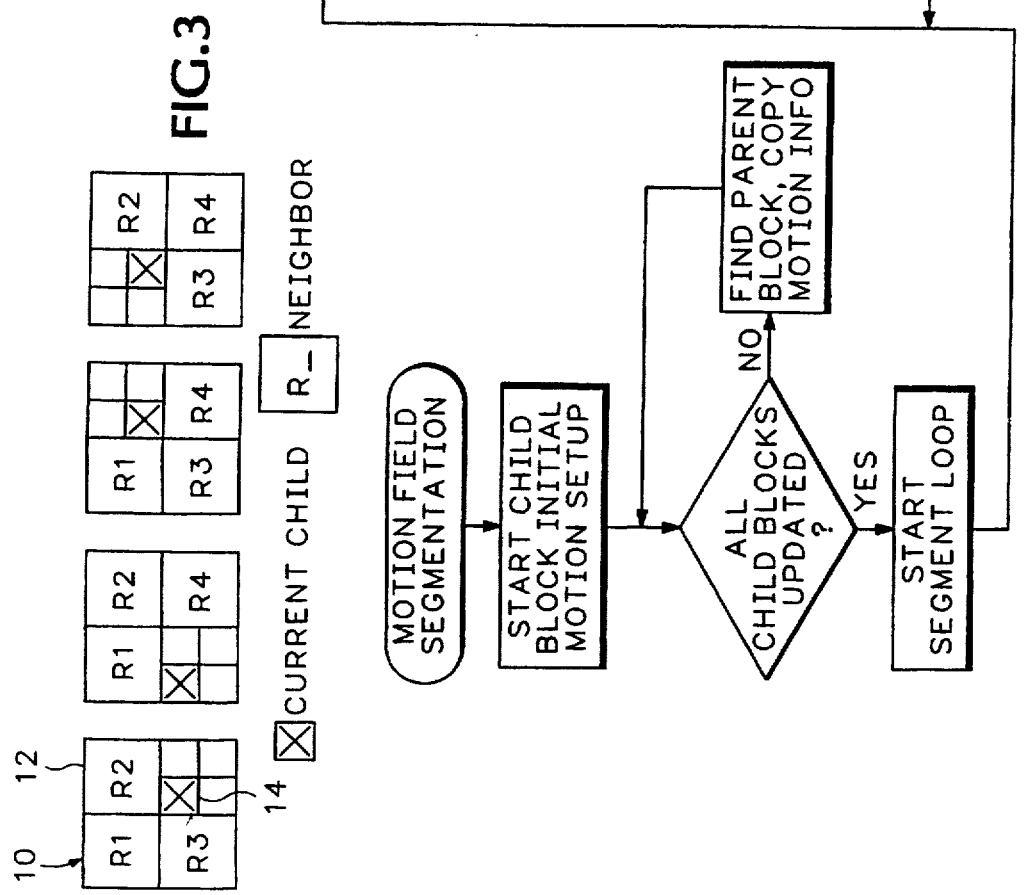

A top to bottom quad tree-like sub-division process is used to refine the motion vector field from coarse to fine resolution. As shown in FIG. 3 each N×M pixel block 10, hereto referred to as a parent block, is first divided into four equal blocks 12, hereto referred to as the child groups. A new motion vector is found for each child block 14 within each group.

Each child block group 12 goes through the same subdivision process repeatedly until the child block reaches the desired fine resolution, i.e., down to pixel resolution if necessary. In order to maintain a smooth motion vector field, the new motion vector for each child block needs to be constrained by the local motion vector field. To satisfy the local motion vector field constraint:

(1) Motion vector search for the child block is restricted to the vicinity around a set of candidate motion vectors. A candidate motion vector is defined as one of the motion vectors of (a) the parent block, (b) the child block groups neighboring the child block, and (c) optionally the weighted average of the parent and neighbor blocks. FIG. 3 shows the neighboring child block groups R1–R4 for each position of the child block X within the child block group in a quad tree-type sub-division. The vicinity of the motion vector (dx, dy) is defined as in the range of $$((-m+dx) \leq dX \leq (m+dx))$$

and $$((-n+dy) \leq dY \leq (n+dy))$$

where m and n are small, non-negative integers, dx and dy define the candidate motion vector, and dX and dY are the motion vector search range for the child block. As indicated in FIG. 4 the new motion vector for the child block is found by selecting the motion vector with minimum displaced frame difference (DFD) measure for the child block, such as the mean absolute difference (MAD) or means square difference (MSD).

(2) To save some computation time, instead of searching around the vicinity of all the candidate motion vectors, as defined above in (1), each candidate motion vector is applied to the child block and the one selected is the one with the minimum DFD measure. Then to improve the estimate still further a search is conducted around the vicinity of the selected motion vector and the final motion vector is derived for the child block.

(3) The sub-dividing process is stopped when the DFD measure is small enough, i.e., less than a certain threshold, otherwise the sub-dividing process continues until the desired fine resolution is reached.

Thus the present invention provides for refinement of block motion vectors to achieve a dense motion field by using only the neighboring motion vectors for refinement, and by stopping the refinement process when the motion vector is deemed good enough to prevent further breaking up of the motion field.

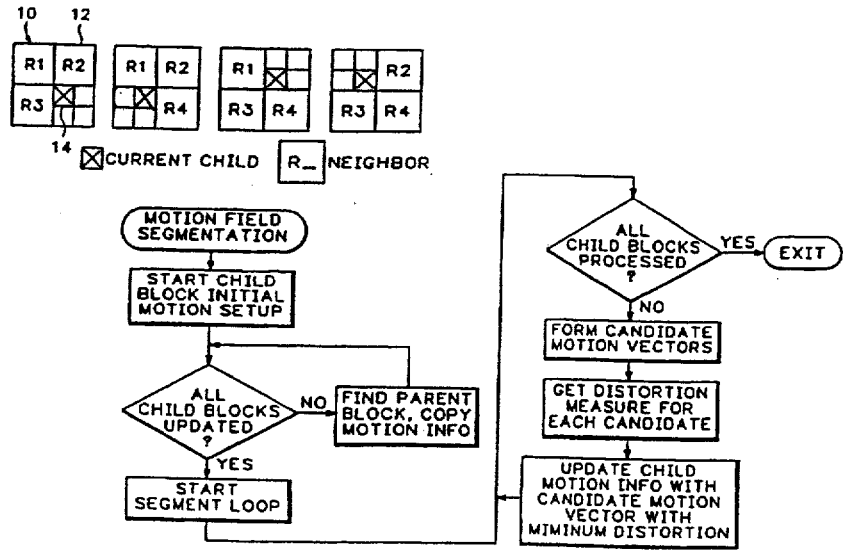

What is claimed is:

1. A method of refining block motion vectors for a video image sequence to achieve a dense motion field comprising the steps of:

subdividing a parent block of pixels from the video image sequence into a plurality of child block groups;

for each child block within a child block group, searching for a motion vector for the child block according to a defined measure as a function of candidate motion vectors associated with the parent block and each neighboring child block group; and repeating the subdividing and searching steps with each child block group as the parent block until the defined measure for the motion vector is less than a specified threshold or the child block represents a single pixel from the video image sequence, the resulting motion vector being the refined block motion vector for the child block.

2. The method as recited in claim 1 wherein the searching step comprises the steps of:

selecting one of the candidate motion vectors;

searching in a vicinity around the selected candidate motion vector for a trial motion vector having a minimum displaced frame difference measure as the defined measure;

repeating the selecting and search step for each of the candidate motion vectors; and selecting as the motion vector the trial motion vector having the minimum displaced frame difference.

3. The method as recited in claim 1 wherein the searching step comprises the step of:

applying each of the candidate motion vectors for the parent and neighboring parent blocks to the child block;

selecting the candidate motion vector from the applying step with the minimum displaced frame difference measure as the defined measure; and searching in the vicinity of the selected candidate motion vector to obtain the motion vector.

* * * * *

UNITED STATES PATENT AND TRADEMARK OFFICE
CERTIFICATE OF CORRECTION

PATENT NO. : 5,748,247
DATED : May 5, 1998
INVENTOR(S) : Shane Ching-Feng Hu

It is certified that error appears in the above-identified patent and that said Letters Patent is hereby corrected as shown below:

The title page, showing the illustrative figures, should be deleted, and substitute therefor the attached title page.

In the Drawings:
Delete Sheet 2 of 2, consisting of FIGS. 3 and 4, and substitute therefor FIG. 3 (showing the corrected Child Block Position) and FIG. 4, as shown on the attached page.

Signed and Sealed this

Twenty-second Day of September, 1998

*Attest:*

BRUCE LEHMAN

*Attesting Officer*   *Commissioner of Patents and Trademarks*

United States Patent [19]

Hu

[11] Patent Number: 5,748,247
[45] Date of Patent: May 5, 1998

[54] REFINEMENT OF BLOCK MOTION VECTORS TO ACHIEVE A DENSE MOTION FIELD

[75] Inventor: Shane Ching-Feng Hu, Beaverton, Oreg.

[73] Assignee: Tektronix, Inc., Wilsonville, Oreg.

[21] Appl. No.: 629,421

[22] Filed: Apr. 8, 1996

[51] Int. Cl.$^6$ .................... H04N 7/30; H04N 7/32
[52] U.S. Cl. .................... 348/413; 348/416; 348/699
[58] Field of Search .................... 348/413, 416, 348/699; H04N 7/30, 7/32

[56] References Cited

U.S. PATENT DOCUMENTS

| | | | |
|---|---|---|---|
| 5,228,098 | 7/1993 | Crinon et al. | 382/56 |
| 5,557,341 | 9/1996 | Weiss et al. | 348/699 |
| 5,561,475 | 10/1996 | Jung | 348/699 |

Primary Examiner—Tommy P. Chin
Assistant Examiner—Diep Nhon Thanh
Attorney, Agent, or Firm—Francis I. Gray

[57] ABSTRACT

Refinement of motion block motion vectors to achieve a dense motion field for temporal video signal processing makes use of candidate motion vectors from a parent block and neighboring child block groups to determine the motion vector for a child block within one of the child block groups. The vicinity of each candidate motion vector may be searched to obtain a trial motion vector having a minimum displaced frame difference measure, with the trial motion vector with the minimum displaced frame difference measure from among all the trial motion vectors being the motion vector for the child block. Alternatively each candidate motion vector may be applied to the child block, and the vicinity of the candidate motion vector having the minimum displaced frame difference being searched to obtain the motion vector for the child block. If the minimum displaced frame difference is not less than a given threshold, the child block is segmented and the process repeated until the child block size is a single pixel or the minimum displaced frame difference is less than the threshold.

3 Claims, 2 Drawing Sheets